(12) United States Patent
Sioui et al.

(10) Patent No.: US 8,261,369 B2
(45) Date of Patent: Sep. 11, 2012

(54) PROTECTIVE ELEMENT FOR SPORTS PADS AND THE LIKE

(75) Inventors: Phil Sioui, St-Jean-sur-le-Richelieu (CA); Jules Hudon, Chambly (CA); Jean Claude Bergeron, Boisbriand (CA)

(73) Assignee: Sport Maska Inc., Montreal, Quebec (CA)

( * ) Notice: Subject to any disclaimer, the term of this patent is extended or adjusted under 35 U.S.C. 154(b) by 1153 days.

(21) Appl. No.: 11/407,901

(22) Filed: Apr. 21, 2006

(65) Prior Publication Data

US 2007/0250965 A1    Oct. 25, 2007

(51) Int. Cl.
*A41D 13/00*    (2006.01)
(52) U.S. Cl. ............................................................ 2/22
(58) Field of Classification Search .................. 2/16, 22, 2/24, 455, 911, 2.5
See application file for complete search history.

(56) References Cited

U.S. PATENT DOCUMENTS

| | | | |
|---|---|---|---|
| 4,306,315 A * | 12/1981 | Castiglia | 2/22 |
| 4,868,926 A | 9/1989 | Lowson | |
| 5,093,931 A | 3/1992 | LaBerge et al. | |
| 5,204,993 A | 4/1993 | Siemens | |
| 5,274,846 A | 1/1994 | Kolsky | |
| 5,405,312 A * | 4/1995 | Jacobs | 602/5 |
| 5,410,756 A | 5/1995 | Hutson | |
| 5,450,625 A | 9/1995 | Hu | |
| 5,456,658 A * | 10/1995 | Duback et al. | 602/8 |
| 5,890,224 A * | 4/1999 | Clark | 2/22 |
| 6,000,055 A | 12/1999 | Citterio | |
| 6,093,468 A | 7/2000 | Toms et al. | |
| 6,336,220 B1 | 1/2002 | Sacks et al. | |
| 6,789,264 B2 * | 9/2004 | Budda | 2/22 |
| 2003/0118806 A1 | 6/2003 | Schonebeck | |
| 2005/0010987 A1 | 1/2005 | Crye et al. | |
| 2005/0034686 A1 | 2/2005 | Spatt | |

* cited by examiner

*Primary Examiner* — Tejash Patel
(74) *Attorney, Agent, or Firm* — Norton Rose Canada LLP

(57) ABSTRACT

An impact resistant insert for a protective pad and having a stiffener layer of impact resistant, thermoformable material retaining a preset curve at ambient temperature such as to substantially return to the preset curve upon deformation, the stiffener layer becoming temporarily more flexible under heat such that the preset curve can be modified to a different preset curve with the stiffener layer subsequently maintaining the different preset curve at ambient temperature. Also, an impact resistant insert for a protective pad and having a front layer of flexible material, a stiffener layer of multi-cell material having front and rear surfaces with the front surface being connected to the front layer, the stiffener layer being substantially resistant to impact forces, retaining a preset curve and substantially returning to the preset curve upon deformation, and a rear layer of flexible material connected to the rear surface of the stiffener layer.

18 Claims, 3 Drawing Sheets

PROTECTIVE ELEMENT FOR SPORTS PADS AND THE LIKE

FIELD OF THE INVENTION

The present invention relates to protective elements, more particularly to protective elements incorporated into protective pads such as are used in contact sports.

BACKGROUND ART

Known protective pads such as, for example, hockey goalie leg pads, knee pads, elbow pads, etc., usually include a rigid layer to protect the wearer against impact injury. Because of the rigid layer, the pads cannot generally be adapted to conform to different body configurations. Having a pad which does not properly fit a wearer can potentially increase the risk of injury and/or reduce the liberty of movement of the wearer. The rigid pads are moreover usually relatively heavy, and as such can limit the activities of the wearer.

In order to provide a better adaptation to a body configuration of a particular wearer, it has been known to provide pads formed of a plurality of pieces flexibly connected together. However, such pads are relatively complex to manufacture, with the links between the various pieces causing an increased risk of failure of the pad. In addition, the interaction between the various pieces of the pad generally increases the risk that the pad can be worn in an incorrect manner, which can give a false sense of security to a wearer and as such increase the risk of injury.

SUMMARY OF INVENTION

It is therefore an aim of the present invention to provide an improved protective element, providing protection against impact injury, which is relatively lightweight.

It is also an aim of the present invention to provide an improved protective element, for protection against impact injury, which can be adapted to different body configurations.

Therefore, in accordance with the present invention, there is provided an impact resistant insert for a protective pad, the insert comprising a stiffener layer of impact resistant, thermoformable material retaining a preset curve at ambient temperature such as to substantially return to the preset curve upon deformation, the stiffener layer becoming temporarily more flexible under heat such that the preset curve can be modified to a different preset curve with the stiffener layer subsequently maintaining the different preset curve at ambient temperature.

Also in accordance with the present invention, there is provided an impact resistant insert for a protective pad, the insert comprising a front layer of flexible material, a stiffener layer of multi-cell material having front and rear surfaces with the front surface being connected to the front layer, the stiffener layer being substantially resistant to impact forces, the stiffener layer retaining a preset curve and substantially returning to the preset curve upon deformation, and a rear layer of flexible material connected to the rear surface of the stiffener layer.

Further in accordance with the present invention, there is provided an ice-hockey goalie pad comprising a core including at least a stiffener layer of impact resistant, thermoformable material retaining a preset curve at ambient temperature such as to substantially return to the preset curve upon deformation, the stiffener layer becoming temporarily more flexible under heat such that the preset curve can be modified to a different preset curve with the stiffener layer subsequently maintaining the different preset curve at ambient temperature, and an envelope surrounding and containing the core.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

Figure 1:
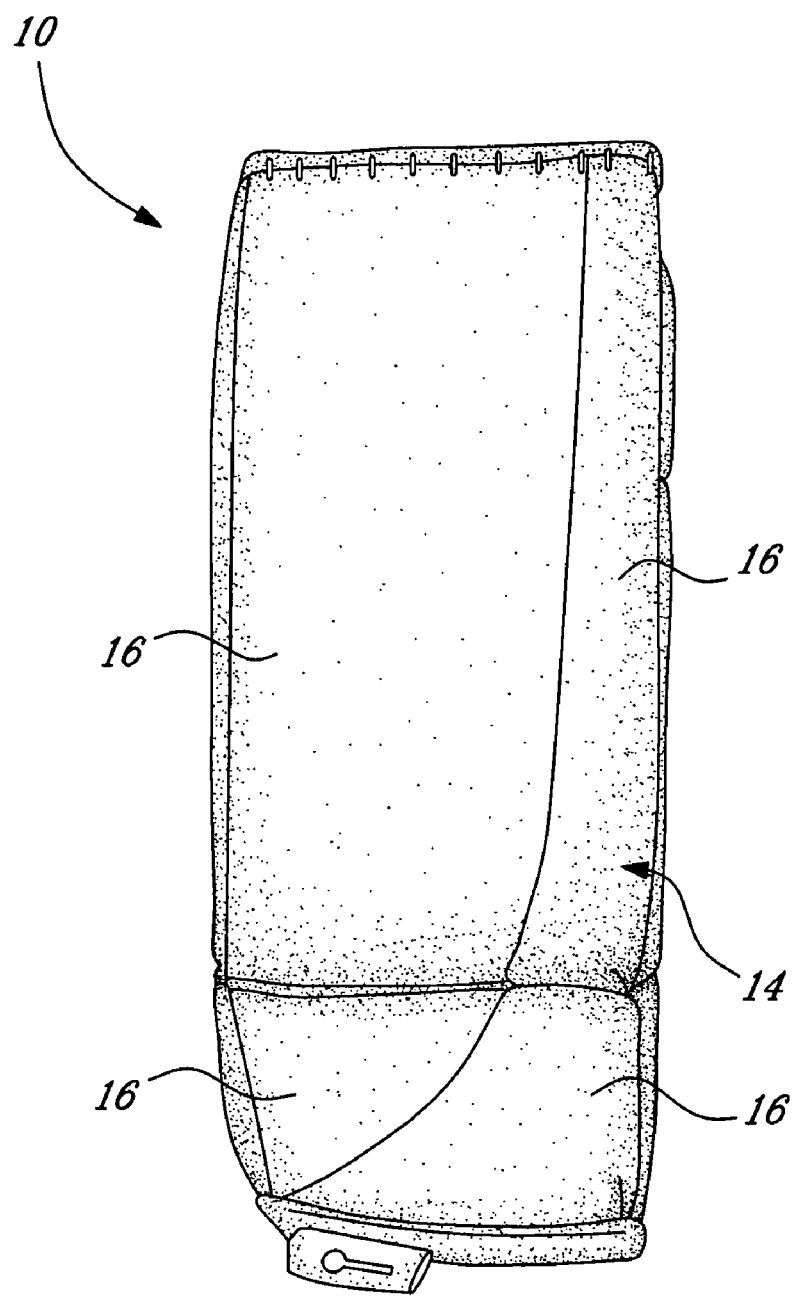
FIG. 1 is a front view of a goalie pad including a protective element according to a particular embodiment of the present invention.

Referring now to FIG. 1, an ice-hockey goalie leg pad (herein after "goalie pad") is generally shown at 10. The goalie pad 10 comprises an internal protective element or insert 12 (see FIG. 2) contained within a pad envelope 14, which can be for example made of leather with a plurality of padded regions 16 included thereon.

Figure 2:
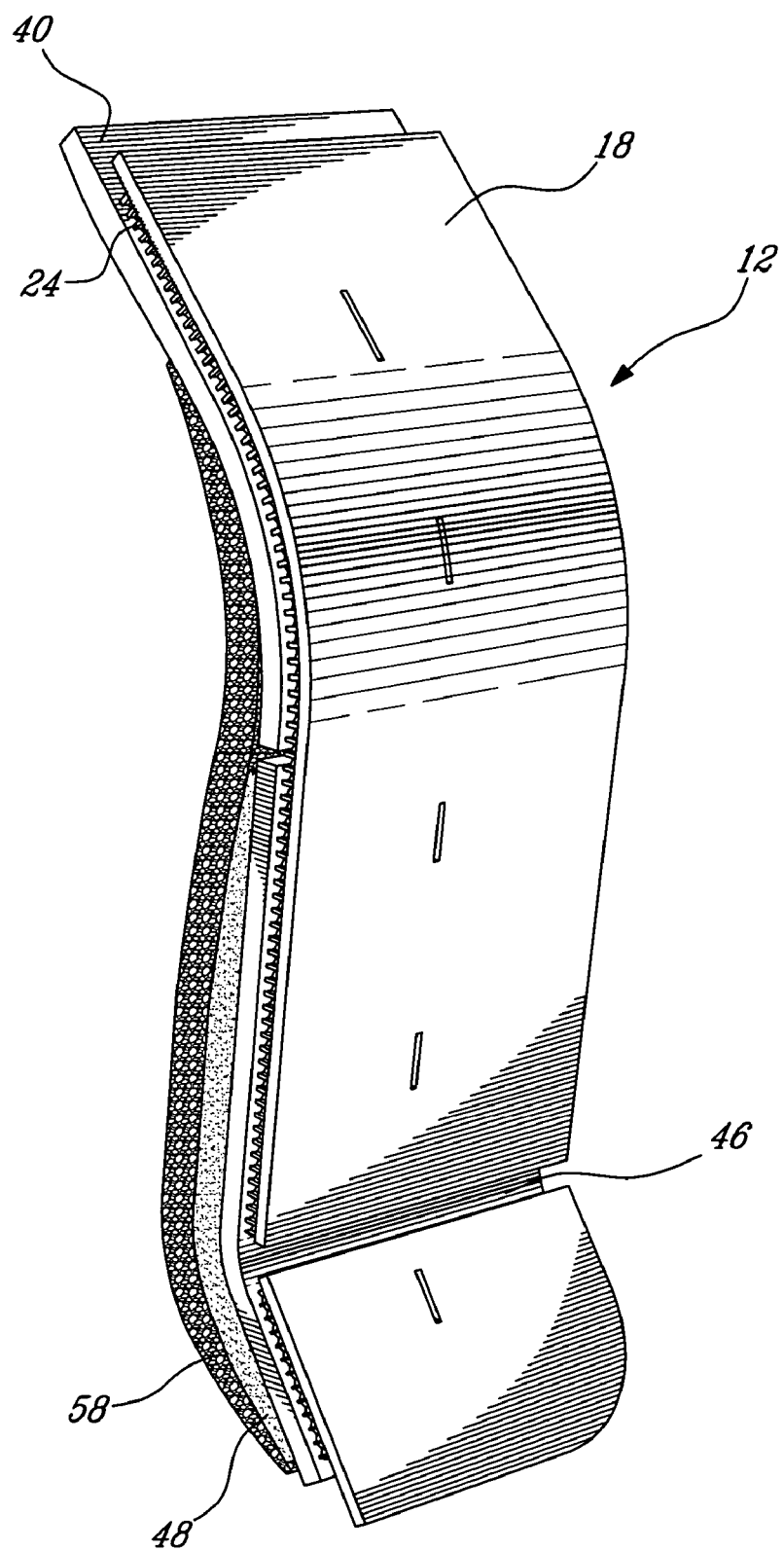
FIG. 2 is a perspective view of a protective element according to a particular embodiment of the present invention.

Referring to FIG. 2, the protective element 12 comprises a plurality of superposed and interconnected layers, including a first layer 18, a second layer 24 and a third layer 40, the second layer 24 being sandwiched between the first and third layers 18, 40.

Figure 3:
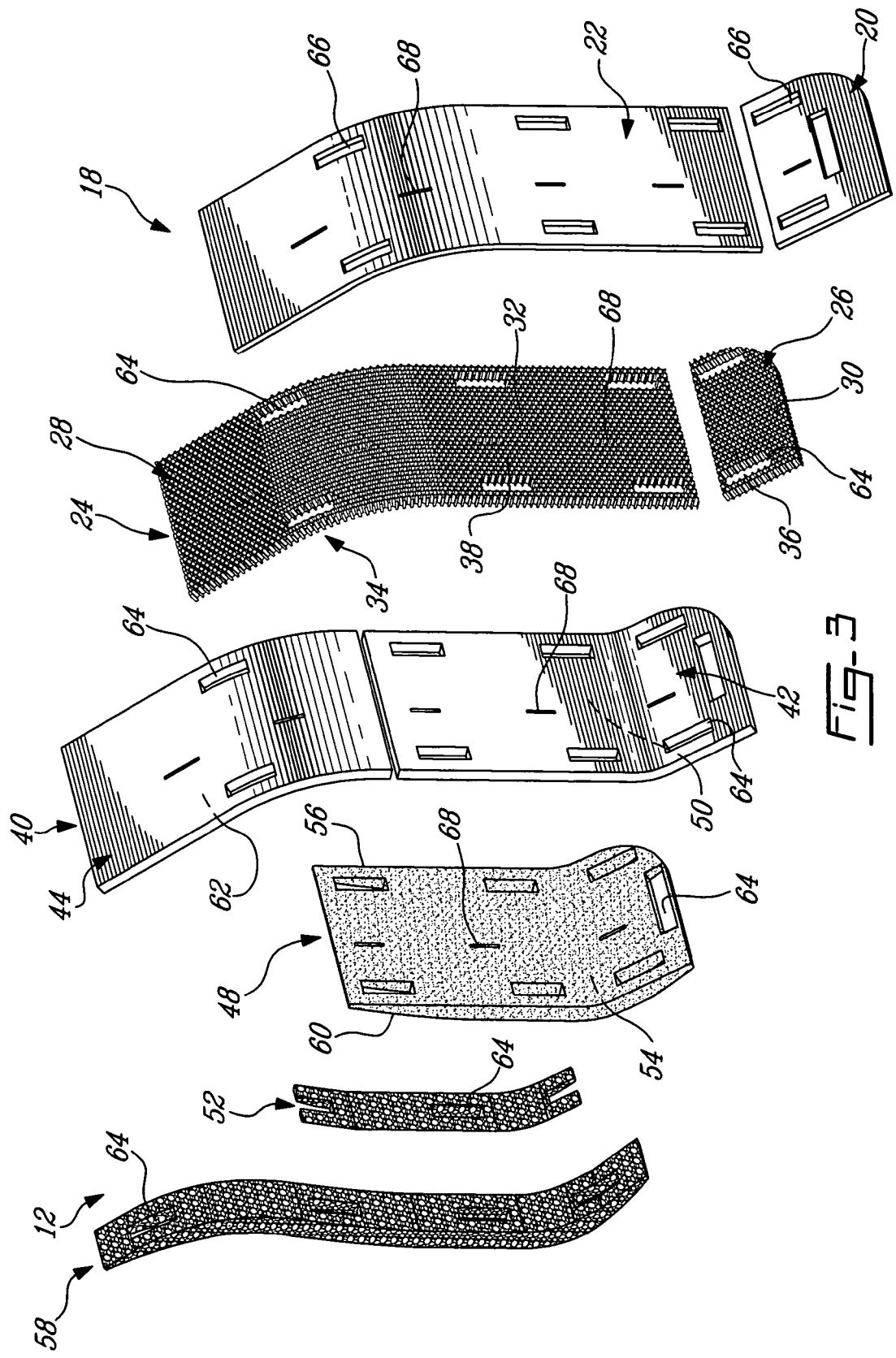
FIG. 3 is a perspective, exploded view of the protective element of FIG. 2.

Referring to FIG. 3, the first layer 18 forms the front of the protective element 12. The first layer 18 is flexible and lightweight, and can be for example made of a foam material such as low density expanded polyethylene (EPE) foam. The first layer 18 includes two separate sections, namely a foot section 20, sized to extend at least partially over the top of the foot area of the wearer, and a longer leg section 22, sized to extend from the instep of the foot to at least above the knee of the wearer.

Again referring to FIG. 3, the second, stiffener layer 24 also includes a foot section 26 and a longer leg section 28. A front surface 30 of the second layer's foot section 26 is connected to the first layer's foot section 20, while a front surface 32 of the second layer's leg section 28 is connected to the first layers' leg section 22. The sections 26, 28 of the stiffener layer 24 include a thermoformable material which can be formed to a preset curve. In the embodiment shown, only the leg section 28 is formed to a preset curve by forming a bend 34, for example of approximately 50 degrees, around the knee area of the wearer. Although the leg section 28 is shown as having a curve about a single axis, it is understood that compound curves are also possible. Alternately, the foot section 26 could also be formed to a preset curve.

The thermoformable material of the second layer 24 is rigid enough such as to be able to retain and preserve the preset curve, and additionally acts to preserve the integrity and rigidity of the entire protective element 12. The thermoformable material permits at least limited flexibility, however provides a consistent return to its preset curve upon deformation. The stiffener layer 24 also helps the protective element 12 to stop and diffuse high impacts forces. As the material of the rigid stiffener layer 24 is thermoformable, the preset curve can be varied and/or subsequently reset by heating the thermoformable material and bending the layer into a new desired curved configuration, then cooling the layer to ambient temperature to set the curve to the new configuration.

In a particular embodiment, the thermoformable material is a multi-cell plastic material, defining abutting hexagonal cells forming a honeycomb pattern. Alternately, cells having a different cross-section can be used, for example square, circular, etc. The multi-cell material can be sandwiched between two sheets of light material, for example Meslyn, defining the front surfaces 30, 32 and rear surfaces 36, 38 of the stiffener layer sections 26, 28. The multi-cell material advantageously provides protection against impact injury while being relatively lightweight and strong, both in flexion and in compression.

The third layer 40 is flexible and lightweight, similarly to the first layer 18, and can also be made for example of a foam material such as low density EPE foam. Still referring to FIG. 3, the third layer 40 includes two separate sections, namely a bottom section 42, sized to extend over the foot area of the wearer and over a lower portion of the leg, and a top section 44, sized to extend over an upper portion of the leg, including the knee, and up to the thigh of the wearer. The bottom section 42 is connected to the rear surface 36 of the second layer's foot section 26 and to part of the rear surface 38 of the second layer's leg section 28. The bottom section 42 thus effectively interconnects the foot and leg sections 20, 22; 26, 28 of the first and second layers 18, 24, defining a flexible hinge 46 (see FIG. 2) therebetween. The top section 44 is connected to the remaining part of the rear surface 38 of the second layer's leg section 28.

Alternately, the two sections 26, 28 of the second layer 24 can be hingedly connected by a single section of the first layer 18, or be directly joined to one another independently from the first and third layers 18, 40, for example by being integral to one another or by being joined through a hinge-like joint.

Referring to FIG. 2, a fourth layer 48 of flexible material can also be provided. Referring to FIG. 3, the fourth layer 48 includes a small section connected to a rear surface 50 of the third layer's bottom section 42. The fourth layer 48 can be made for example of foam material such as low density polyurethane foam.

Still referring to FIG. 3, edge pieces can also be provided to define a rear profile for the protective element 12 suitable for receiving the wearer's leg. The edge pieces include a small edge piece 52, which is connected to a rear surface 54 of the fourth layer 48 along a first side edge 56 thereof, and a long edge piece 58, which is connected to the rear surface 54 of the fourth layer 48 along a second side edge 60 thereof and extends upwardly beyond the fourth layer 48 to be also connected to a rear surface 62 of the third layer's top section 44.

In a particular embodiment, the layers are glue laminated together to form the composite protective element 12.

In an alternate embodiment, the layers are detachably interconnected, for example through a plurality of complementary strips of hook and loop type fasteners 64 provided on the abutting surfaces of the layers 18, 24, 40, 48 and edge pieces 52, 58. The protective element or core can also be attached to the exterior envelope using similar strips of hook and loop type fasteners 66, or alternately by having a series of straps (not shown) extending from a rear side of a front face of the envelope and passing through a series of aligned slots 68 defined in the various layers to be attached at the rear of the envelope, for example with hook and loop type fasteners.

Although shown here as the core of a goalie pad, the protective element can alternately be incorporated in a variety of other types of protective equipment such as, for example, knee pads, elbow pads, shoulder pads, etc.

Also, although the stiffener layer 24 has been shown here as sandwiched between the two flexible layers 18, 40, the stiffener layer 24 can alternately be used independently, i.e. without being connected to any flexible layers, in some types of protective equipment. The stiffener layer 24 can also be used in connection with only one of the flexible layers 18, 40.

Thus, the stiffener layer 24 of the protective element 12 provides protection against impact injury, while being lightweight, especially when the stiffener layer 24 is composed of multi-cell material. The stiffener layer 24 made of thermoformable material allows the protective element 12 to be formed with a preset curve to conform to a particular body configuration or a preferred pad shape, and to be re-formed with a different preset curve when required simply by shaping the protective element 12 under heat. As such, a manufacturer can easily form different types of protective elements 12 from a same geometry, by varying the curve of the protective element 12 for each type. A same protective element 12 can also be re-formed when the needs of a wearer change, or when the element 12 is used by a different wearer.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. An ice-hockey goalie pad comprising:
a core including at least a stiffener layer of impact resistant, thermoformable material retaining a preset curve at ambient temperature such as to substantially return to the preset curve upon deformation, the stiffener layer becoming temporarily more flexible under heat to allow the preset curve to be modified to a different preset curve with the stiffener layer subsequently maintaining the different preset curve at ambient temperature, the stiffener layer including foot and leg sections, the core further including a layer of flexible material connected to a surface of the stiffener layer and interconnecting the foot and leg sections, the layer of flexible material conforming to the preset curve; and
an envelope surrounding and containing the core.

2. The pad according to claim 1, wherein the layer of flexible material includes a foam material.

3. The pad according to claim 1, wherein the layer of flexible material is detachably connected to the stiffener layer.

4. The pad according to claim 3, wherein the layer of flexible material is detachably connected to the stiffener layer by hook and loop fasteners.

5. The pad according to claim 1, wherein the core is connected to the envelope through strips of hook and loop type fasteners extending on an inner surface of the envelope and engaged to complementary strips of hook and loop type fasteners extending on an outer surface of the core.

6. The ice-hockey goalie pad according to claim 1, wherein the impact resistant, thermoformable material is a multi-cell material.

7. The pad according to claim 6, wherein the multi-cell material is formed of a plurality of abutting hexagonal cells forming a honeycomb pattern.

8. The ice-hockey goalie pad according to claim 1, wherein the layer of flexible material is a first layer, the stiffener layer including a second layer of flexible material connected to the stiffener layer opposite of the first layer of flexible material and conforming to the preset curve.

9. The pad according to claim 8, wherein the flexible material of the first and second flexible layers comprises foam material.

10. The pad according to claim 8, wherein the stiffener layer is detachably connected to the first and second flexible layers.

11. A method of manufacturing a leg pad core, comprising:
forming foot and leg sections with a stiffener layer of impact resistant material retaining a first curved configuration at ambient temperature and returning to the first curved configuration after deformation;
connecting a layer of flexible material to a first surface of the stiffener layer;
heating the core to heat the stiffener layer to a formable state;
deforming the heated core to create a second curved configuration for the stiffener layer different from the first curved configuration;
cooling the core to ambient temperature to set the second curved configuration, the stiffener layer returning to the second curved configuration after deformation following setting of the second curved configuration.

12. The method according to claim 11, wherein connecting the layer of flexible material includes interconnecting the foot and leg sections with the layer of flexible material.

13. The method according to claim 11, wherein the layer of flexible material is a first layer, the method further includes connecting a second layer of flexible material to an opposed surface of the stiffener layer to conform to the configuration thereof.

14. The method according to claim 13, further comprising connecting a third layer of flexible material to the first layer opposite of the stiffener layer.

15. The method according to claim 14, further comprising connecting two spaced apart edges pieces to the third layer opposite of the first layer, the edge pieces defining a rear profile suitable for receiving a wearer's leg.

16. The method according to claim 11, wherein connecting the layer of flexible material includes connecting a foam material to the surface of the stiffener layer.

17. The method according to claim 11, wherein connecting the layer of flexible material includes detachably connecting the layer of flexible material to the surface of the stiffener layer.

18. A method of adjusting a leg pad including a core with foot and leg sections defined by a stiffener layer of impact resistant material retaining a first curved configuration at ambient temperature and returning to the first curved configuration after deformation, and a layer of flexible material conforming to a surface of the stiffener layer, the method comprising:
heating the leg pad to heat the stiffener layer to a formable state;
deforming the heated pad to create a second curved configuration for the stiffener layer different from the first curved configuration; and
cooling the pad to ambient temperature to set the second curved configuration, the stiffener layer returning to the set-second curved configuration after deformation following setting of the second curved configuration.

* * * * *